United States Patent [19]

Tsuda et al.

[11] Patent Number: 5,712,335
[45] Date of Patent: Jan. 27, 1998

[54] AQUEOUS FLUORINE-CONTAINING POLYMER DISPERSION

[75] Inventors: Nobuhiko Tsuda; Yasushi Yonei; Ryuzi Iwakiri; Katsuhiko Imoto, all of Settsu, Japan

[73] Assignee: Daikin Industries, Ltd., Osaka, Japan

[21] Appl. No.: 666,356

[22] PCT Filed: Oct. 19, 1995

[86] PCT No.: PCT/JP95/02152

§ 371 Date: Jun. 21, 1996

§ 102(e) Date: Jun. 21, 1996

[87] PCT Pub. No.: WO96/12773

PCT Pub. Date: May 2, 1996

[30] Foreign Application Priority Data

Oct. 24, 1994 [JP] Japan .................... 6-258173

[51] Int. Cl.$^6$ .................... C08K 5/54; C08K 9/06; C08L 27/16; C08L 27/12
[52] U.S. Cl. .................... 524/269; 524/506; 524/520; 524/265; 523/201; 523/203; 523/212
[58] Field of Search .................... 523/201, 203, 523/212; 524/262, 269, 506, 520, 265

[56] References Cited

U.S. PATENT DOCUMENTS

| | | | |
|---|---|---|---|
| 3,325,434 | 6/1967 | Tully | 524/520 |
| 3,838,082 | 9/1974 | Sauer | 524/520 |
| 3,879,302 | 4/1975 | Reick | 523/209 |
| 4,503,179 | 3/1985 | Yoshimura et al. | 524/262 |
| 4,514,537 | 4/1985 | Cavanaugh | 524/520 |
| 5,030,667 | 7/1991 | Shimizu et al. | 523/201 |
| 5,194,335 | 3/1993 | Effenberger et al. | 524/520 |
| 5,216,081 | 6/1993 | Mohri et al. | 524/520 |
| 5,344,862 | 9/1994 | Nohr et al. | 524/269 |

FOREIGN PATENT DOCUMENTS

| | | |
|---|---|---|
| 62-141073 | 6/1987 | Japan . |
| 4-292673 | 10/1992 | Japan . |
| 5-170909 | 7/1993 | Japan . |
| 5-339537 | 12/1993 | Japan . |

*Primary Examiner*—Tae Yoon
*Attorney, Agent, or Firm*—Varndell Legal Group

[57] ABSTRACT

An aqueous dispersion of a fluorine-containing polymer, wherein 1 to 20 parts by weight of solids of an organosilicon compound is admixed on the basis of 100 parts by weight of solids in the fluorine-containing-polymer-dispersed aqueous composition and this aqueous dispersion is useful for a paint capable of forming a coating film which is excellent in adhesion to various base materials, film forming property, weatherability and soil resistance.

7 Claims, No Drawings

AQUEOUS FLUORINE-CONTAINING POLYMER DISPERSION

TECHNICAL FIELD

The present invention relates to an aqueous dispersion of a fluorine-containing polymer, particularly relates to an aqueous dispersion of a fluorine-containing polymer, which contains an organosilicon compound and is used suitably for various paints.

BACKGROUND ART

In the field of paints, various aqueous dispersions have been heretofore proposed. For example, JP-A- 1790/1992 discloses an aqueous dispersion of an acrylic copolymer and an aqueous dispersion comprising colloidal silica and a silane compound having a hydrolyzable group, but those dispersions are not satisfactory of stability of the dispersions, weatherability and long-term durability. Also JP-B-46394/1993 discloses an aqueous dispersion comprising organotrihydroxysilane, partially condensated product thereof, colloidal silica and silicone-modified acrylic resin, but that dispersion does not satisfy the requirements for weatherability and long-term durability.

From the above-mentioned points of view, an object of the present invention is to obtain an aqueous dispersion of a fluorine-containing polymer by combining a specific fluorine-containing polymer and an organosilicon compound, the polymer being excellent in dispersing stability and the aqueous dispersion being able to provide paints excellent in long-term adhesion, weatherability and soil resistance.

DISCLOSURE OF THE INVENTION

The present invention relates to an aqueous dispersion of a fluorine-containing polymer, wherein 1 to 20 parts by weight of an organosilicon compound is admixed on the basis of 100 parts by weight of solids in a fluorine-containing-polymer-dispersed aqueous composition.

In the present invention, it is preferable that a fluorine-containing polymer in the fluorine-containing-polymer-dispersed aqueous composition a fluorine-containing polymer obtained by polymerizing a fluoroolefin or by copolymerizing a fluoroolefin with a monomer being copolymerizable therewith, and that after the above-mentioned polymerization or copolymerization, the organosilicon compound is admixed therewith.

Also in the present invention, it is preferable that the fluorine-containing polymer in the above-mentioned fluorine-containing-polymer-dispersed aqueous composition is a fluorine-containing seed polymer obtained by seed-polymerizing a monomer having a reactive α,β-unsaturated group in the presence of particles of a fluorine-containing polymer obtained by polymerizing a fluoroolefin or by copolymerizing a fluoroolefin with a monomer being copolymerizable therewith, and that an organosilicon compound is admixed therewith after the above-mentioned seed-polymerization.

Further in the present invention, it is preferable that the above-mentioned monomer having the reactive α,β-unsaturated group is an acrylic acid ester and/or a methacrylic acid ester.

Further in the present invention, it is preferable that a part of the above-mentioned monomer having the reactive α,β-unsaturated group is an organosilicon compound having a reactive α,β-unsaturated group, said organosilicon compound being contained in the monomer having the reactive α,β-unsaturated group in an amount of 0.1 to 50% by weight.

Also in the present invention, it is preferable that the above-mentioned fluorine-containing polymer contains 70 to 95% by mole of vinylidene fluoride and 5 to 30% by mole of chlorotrifluoroethylene.

Further the present invention, it is preferable that the fluorine-containing polymer in the above-mentioned fluorine-containing-polymer-dispersed aqueous composition is the fluorine-containing seed polymer obtained by seed-polymerizing an acrylic acid ester and/or a methacrylic acid ester in the presence of particles of a fluorine-containing polymer obtained by copolymerizing a monomer mixture containing 70 to 95% by mole of vinylidene fluoride and 5 to 30% by mole of chlorotrifluoroethylene, and that the organosilicon compound is admixed therewith after the above-mentioned copolymerization or seed polymerization.

Further in the present invention, it is preferable that the above-mentioned organosilicon compound is an organosilicon monomer represented by the formula (I):

$$R^1_a Si(OR^2)_{4-a} \qquad (I)$$

wherein $R^1$ is a non-hydrolyzable group or hydrogen atom, $R^2$ is alkyl, aryl, alkenyl or hydrogen atom, a is 0, 1 or 2.

Further in the present invention, it is preferable that the above-mentioned organosilicon compound is an organosilicon oligomer represented by the formula (III):

$$R^2O\!-\!\!\left(\!\!\begin{array}{c} R^1 \\ | \\ Si\!-\!O \\ | \\ OR^2 \end{array}\!\!\right)_{\!\!c}\!\!-\!R^2 \qquad (III)$$

wherein $R^1$ is a non-hydrolyzable group or hydrogen atom, $R^2$ is alkyl, aryl, alkenyl or hydrogen atom, c is an integer of 2 to 50.

Further in the present invention, it is preferable that the above-mentioned organosilicon compound is an organosilicon oligomer represented by the formula (V):

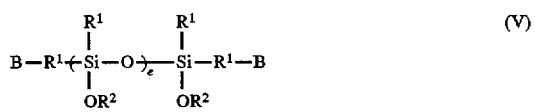

$$B\!-\!R^1\!\!-\!\!\left(\!\!\begin{array}{cc} R^1 & R^1 \\ | & | \\ Si\!-\!O \\ | \\ OR^2 & OR^2 \end{array}\!\!\right)_{\!\!e}\!\!Si\!-\!R^1\!-\!B \qquad (V)$$

wherein $R^1$ is a non-hydrolyzable group or hydrogen atom, $R^2$ is alkyl, aryl, alkenyl or hydrogen atom, B is a surface active group, e is an integer of 2 to 50.

BEST MODE FOR CARRYING OUT THE INVENTION

The organosilicon compound in the present invention is at least one organosilicon compound selected from the group consisting of organosilicon monomers and its partially condensated products (linear polysiloxanes and three dimensional polysiloxanes), and is bonded to the skeleton of the above-mentioned fluorine-containing polymer or contains a hydrolyzable silyl group.

An object of use of the above-mentioned organosilicon compound is to further enhance flexibility and soil resistance in addition to long-term adhesion to organic or inorganic base materials, weatherability, chemical resistance and film forming property when used for paints.

The above-mentioned organosilicon monomer is a monomer represented by the formula (I):

$$R^1{}_a Si(OR^2)_{4-a} \quad (I)$$

wherein $R^1$ is a non-hydrolyzable group or hydrogen atom, $R^2$ is alkyl, aryl, alkenyl or hydrogen atom, a is 0, 1 or 2.

Examples of the non-hydrolyzable group of the above-mentioned formula (I) are, for instance, an alkyl group such as methyl, ethyl or propyl; an aryl group such as phenyl, tolyl or mesityl; an alkenyl group such as vinyl or allyl; a haloalkyl group such as γ-chloropropyl; an aminoalkyl group such as γ-aminopropyl or γ-(2-aminoethyl) aminopropyl; an epoxyalkyl group such as γ-glycidoxypropyl or β-(3,4-epoxycyclohexyl)ethyl; a methacryloyloxyalkyl group such as γ-mercaptoalkyl or γ-methacryloyloxypropyl; a hydroxyalkyl group such as γ-hydroxypropyl; and the like. From a point that reactivity is lowered when that substituent has a large number of carbon atoms, the preferable substituent in the present invention is an alkyl having not more than 8, preferably not more than 4 carbon atoms; a substituted alkyl such as an aminoalkyl, an epoxyalkyl, methacryloyloxyalkyl or hydroxyalkyl; a kind of aryl, i.e. phenyl; and an alkenyl having 2 or 3 carbon atoms. With respect to the alkyl, aryl and alkenyl of $R^2$, there are employed similar groups to the above-mentioned $R^1$, and particularly preferable is alkyl having not more than 4 carbon atoms from a point that reactivity is lowered when the substituent has a large number of carbon atoms.

Examples of the above-mentioned formula (I) are, for instance, tetramethoxysilane, tetraethoxysilane, tetrapropoxysilane, methyltrimethoxysilane, methyltriethoxysilane, dimethyldimethoxysilane, vinyltriethoxysilane, phenyltrimethoxysilane, phenyltriethoxysilane, γ-chloropropyltrimethoxysilane, γ-aminopropyltrimethoxysilane, N-(β-aminoethyl) aminopropyltrimethoxysilane, γ-glycidoxypropyltrimethoxysilane, β-(3,4-epoxycyclohexyl)ethyltrimethoxysilane, γ-mercaptopropyltrimethoxysilane, γ-methacryloyloxypropyltrimethoxysilane, γ-hydroxypropyltrimethoxysilane and the like. In view of reactivity, flexibility film forming property, and the like, preferable are methyltrimethoxysilane, phenyltrimethoxysilane and γ-methacryloyloxypropyltrimethoxysilane.

The linear polysiloxane, i.e. a partially condensed product obtained from the monomer represented by the above-mentioned formula (I) is at least one selected from the group consisting of the formula (II):

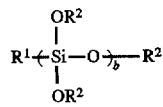

wherein $R^1$ and $R^2$ are the same as above, b is an integer of 2 to 50, the formula (III):

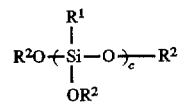

wherein $R^1$ and $R^2$ are the same as above, c is an integer of 2 to 50, the formula (IV):

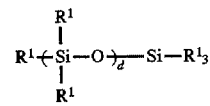

wherein $R^1$ is the same as above, d is an integer of 2 to 50, the formula (V):

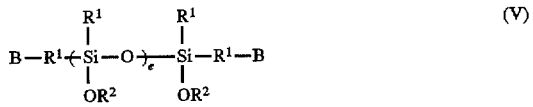

wherein $R^1$ and $R^2$ are the same as above, B is a surface active group, e is an integer of 2 to 50 and the formula (VI):

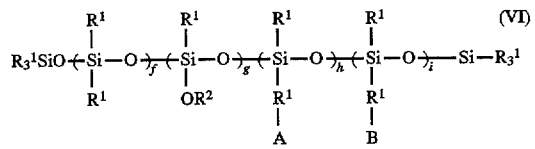

wherein $R^1$ and $R^2$ are the same as above, A is a fluorine-containing group, B is a surface active group, f, g, h and i are 0 or an integer of 1 to 20, respectively.

Examples of the above-mentioned formula (II) are, for instance,

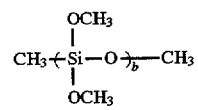

wherein b is an integer of 2 to 20, and the like. It is preferable that b is an integer of 2 to 8, because when the degree of condensation is high, compatibility with the fluorine-containing-polymer-dispersed aqueous composition is lowered, flexibility of a coating film becomes insufficient and adhesion to the base materials is lowered.

Examples of the above-mentioned formula (III) are, for instance,

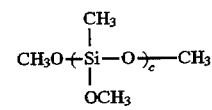

wherein c is an integer of 2 to 20, and the like. It is preferable that c is an integer of 2 to 10, because when the degree of condensation is high, compatibility with the fluorine-containing-polymer-dispersed aqueous composition is lowered, flexibility of a coating film becomes insufficient and adhesion to the base materials is lowered.

Examples of the above-mentioned formula (IV) are, for instance,

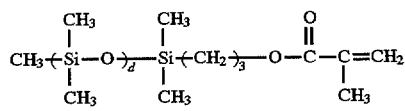

wherein d is an integer of 1 to 50, and the like. It is preferable that d is an integer of 1 to 20, because when the degree of condensation is high, compatibility with the fluorine-containing-polymer-dispersed aqueous composition is lowered, flexibility of a coating film becomes insufficient and adhesion to the base materials is lowered.

Examples of the above-mentioned formula (V) are, for instance,

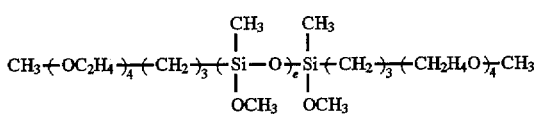

wherein e is an integer of 1 to 20, and the like. It is preferable that e is an integer of 1 to 10, because when the degree of condensation is high, compatibility with the fluorine-containing-polymer-dispersed aqueous composition is lowered, flexibility of a coating film becomes insufficient and adhesion to the base materials is lowered.

In the above-mentioned formula (VI), the fluorine-containing group has a function to enhance compatibility with a fluorine-containing compound of fluorine-containing polymer particles, for instance, fluoroolefin copolymer particles. For example, there are fluoroalkyl, perfluoroalkyl, polyfluoroalkyl and the like.

In the above-mentioned formulae (V) and (VI), examples of the surface active group are, for instance, anionic surface active groups such as carboxylic acid salt, alkylsulfate, alkylbenzenesulfonate, polyoxyethylene alkylsulfate and polyethylene alkyl phenol ether sulfate; cationic surface active groups such as alkyltrimethyl ammonium salt and dialkyldimethyl ammonium salt; nonionic surface active groups such as polyoxyethylene alkyl ether, polyoxyethylene alkyl phenol ether, ethylene oxide/propylene oxide block polymer and sorbitan derivative; and the like. Preferable are polyoxyethylene alkyl ether and a combination of the nonionic surface active group and the anionic surface active group from the viewpoint of compatibility and stability of an aqueous dispersion.

Examples of the above-mentioned formula (VI) are, for instance,

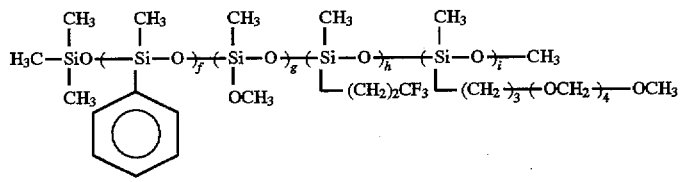

wherein f, g, h and i are 0 or an integer of 1 to 20, respectively. It is preferable, from the viewpoints of film forming property and adhesion to the base material, that f is 0 or an integer of 1 to 5, g is an integer of 2 to 10, h is 0 or an integer of 1 to 5, i is an integer of 1 to 10, and the sum of f, g, h and i is an integer of 3 to 30.

The three dimensional polysiloxane obtained from the above-mentioned linear polysiloxane is one which contains at least one siloxane unit selected from the group consisting of the following formulae (VII), (VIII) and (IX) and is subjected to condensation with at least a part of a molecular chain of the linear polysiloxane represented by the above-mentioned formulae (II) to (VI). Formula (VII):

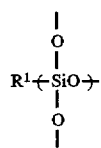

(VII)

(wherein R¹ is the same as above)

Formula (VIII):

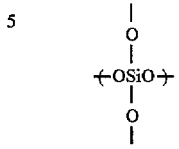

(VIII)

Formula (IX):

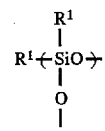

(IX)

(wherein R¹ is the same as above).

Among the above-mentioned organosilicon compounds, particularly organosilicon monomer preferably added when synthesizing the fluorine-containing polymer and fluorine-containing seed polymer mentioned hereinafter, from flexibility point of view. Moreover among the organosilicon it is monomers, it is preferable, from the viewpoint of film forming property and gloss, to incorporate the organosilicon compound having a reactive α,β-unsaturated group, which is mentioned hereinafter.

The use of excess amount of the organosilicon compound having the reactive α,β-unsaturated group at the time of the above-mentioned synthesis can give the same effect as in case of addition of the above-mentioned organosilicon compound after the synthesis.

Also among the above-mentioned organosilicon compounds, it is preferable, from the viewpoint of stability of the aqueous dispersion and adhesion to the base material, that particularly a partial condensation product of the organosilicon monomer is added after the synthesis of the fluorine-containing polymer and the fluorine-containing seed polymer mentioned later. Among the above-mentioned partial condensation products, those represented by the formulae (III), (V) and (VI) are preferable in view of adhesion to the base material and film forming property.

In the above-mentioned examples of the formulae (III) and (V), preferable are

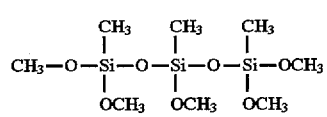

and

-continued

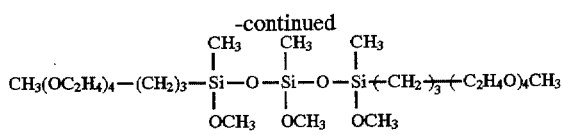

from the viewpoints of stability of the dispersion, adhesion to the base material and film forming property.

The aqueous dispersion of the fluorine-containing polymer of the present invention is an aqueous dispersion of the fluorine-containing polymer in which particles of the specific fluorine-containing polymer are dispersed in water and the organosilicon compound is added thereto.

The above-mentioned specific fluorine-containing polymer is the specific fluorine-containing polymer or the specific fluorine-containing seed polymer.

The above-mentioned specific fluorine-containing polymer is a polymer of fluoroolefin or a polymer obtained by copolymerizing fluoroolefin with a monomer copolymerizable therewith.

Examples of the above-mentioned fluoroolefin are, for instance, ones having about 2 to about 4 carbon atoms, such as vinylidene fluoride (VdF), tetrafluoroethylene (TFE), chlorotrifluoroethylene (CTFE), hexafluoropropylene (HFP), trifluoroethylene, pentafluoropropylene, vinyl fluoride and the like. From a point of polymerizability, VdF, TFE, CTFE and HFP are preferable.

Examples of the monomers being copolymerizable with the above-mentioned fluoroolefin are, for instance, alkyl vinyl ethers such as cyclohexyl vinyl ether (CHVE), ethyl vinyl ether (EVE), butyl vinyl ether and methyl vinyl ether; alkenyl vinyl ethers such as polyoxyethylene allyl ether (POEAE) and ethyl allyl ether; organosilicon compounds having a reactive α,β-unsaturated group such as vinyltrimethoxysilane (VSi) and vinyltriethoxysilane; vinyl esters of aliphatic carboxylic acid such as vinyl acetate and vinyl laurylate; vinyl esters of aromatic carboxylic acid such as vinyl benzoate; (meth)acrylic acid esters such as methyl (meth)acrylate and ethyl (meth)acrylate; and the like. From the viewpoint of copolymerizability, film forming and property weatherability, preferable are alkyl vinyl ethers, allyl vinyl ethers and organosilicon compounds having a reactive α,β-unsaturated group, and further preferable are CHVE, EVE, POEAE and VSi.

The above-mentioned specific fluorine-containing seed polymer is one which can be obtained by polymerizing a monomer having a reactive α,β-unsaturated group in the presence of particles of the above-mentioned fluorine-containing polymer.

Examples of the above-mentioned monomer having a reactive α,β-unsaturated group are, for instance, acrylates such as methyl acrylate, butyl acrylate (BA), ethyl acrylate (EA) and 2-ethylhexyl acrylate; methacrylates such as methyl methacrylate (MMA), butyl methacrylate (BMA) and polyoxyethylene methacrylate (POEMA); organosilicon compound having a reactive α,β-unsaturated group such as γ-methacryloyloxypropyltrimethoxysilane (SiMA) and γ-methacryloyloxypropylmethyldimethoxysilane; aromatic vinyl compounds such as styrene and p-tert-butylstyrene; vinyl esters such as vinyl acetate and vinyl benzoate (vinyl ester available from Shell Petroleum Co., Ltd., tradename VEOBA); and the like. From viewpoints of film forming property, weatherability and the like, preferable are acrylates, methacrylates, organosilicon compounds having a reactive α,β-unsaturated group and vinyl esters, and further preferable are BA, MMA, POEMA and SiMA.

Solid content of the aqueous dispersion of the fluorine-containing polymer of the present invention is, for instance, 30 to 60% (% by weight, hereinafter the same), preferably 35 to 55%. When the solid content is less than 30%, there is a tendency that it becomes difficult to adjust a viscosity when used for paints, and when more than 60%, storage stability of the dispersion tends to be lowered.

Average particle size of the fluorine-containing polymer particles in the above-mentioned aqueous dispersion of the fluorine-containing polymer is, for instance, 50 to 250 nm, preferably 80 to 200 nm. When the average particle size is less than 50 nm, there is a tendency that a viscosity of the aqueous dispersion is increased and that the aqueous dispersion having a high concentration cannot be obtained, and when more than 250 nm, the dispersed particles tend to be precipitated and coagulated when the aqueous dispersion is stored.

Amount of the above-mentioned organosilicon compound of the present invention is, for instance, from 1 to 20 parts (part by weight, hereinafter the same), preferably from 1 to 10 parts on the basis of 100 parts of solids in the fluorine-containing-polymer-dispersed aqueous composition. When less than 1 part, there is a tendency that the effects (adhesion and weatherability) of addition of the organosilicon compound cannot be obtained, and when more than 20 parts, there is a tendency that the effect of addition of excess amount of the organosilicon compound cannot be obtained.

An object of use of the above-mentioned organosilicon compound having a reactive α,β-unsaturated group for seed polymerization is to give flexibility to a coating film of the fluorine-containing seed polymer and to obtain adhesion to base materials, film forming property and weatherability of the coating film.

Amount of the above-mentioned organosilicon compound having a reactive α,β-unsaturated group of the present invention is from 0.1 to 50%, preferably from 0.1 to 40%, more preferably from 0.1 to 30% in the above-mentioned monomer having a reactive α,β-unsaturated group. When less than 0.1%, there is a tendency that it becomes difficult to obtain flexibility, adhesion to base materials and weatherability of a coating film, and when more than 50%, there is a tendency that the effect of addition of excess amount becomes difficult to obtain.

It is preferable that the above-mentioned fluorine-containing polymer of the present invention contains 70 to 95% by mole, preferably 75 to 90% by mole, more preferably 75 to 85% by mole of the above-mentioned VdF and 5 to 30% by mole, preferably 10 to 25% by mole, more preferably 15 to 25% by mole of the above-mentioned CTFE.

When the VdF is less than 75% by mole, there is a tendency that compatibility of the fluorine-containing polymer (seed for the seed polymerization) with the (meth) acrylate monomer is lowered and it becomes difficult to obtain transparency and mechanical property of a formed film. When the CTFE is less than 5% by mole, there is a tendency that compatibility of the fluorine-containing polymer (seed for the seed polymerization) with the (meth) acrylate monomer is lowered and it becomes difficult to obtain transparency and mechanical property of a formed film.

The aqueous dispersion of the fluorine-containing polymer of the present invention may be prepared, for example, in such manners as mentioned below.

(1) A process for preparing the aqueous dispersion of the fluorine-containing polymer of the present invention, which contains particles of the fluorine-containing polymer, comprising; adding water and the emulsifying agent to a reactor, repeating introduction of a pressurized nitrogen gas and deaeration, introducing the pressurized fluoroolefin monomer, and if necessary, adding the monomer copolymerizable with the fluoroolefin, and adding the polymerization initiator, maintaining the inside pressure of the reactor constant for a given period of time, rendering the reaction system to normal temperature and normal pressure, and then adding the above-mentioned organosilicon compound.

(2) A process for preparing the aqueous dispersion of the fluorine-containing polymer of the present invention, which contains particles of the fluorine-containing seed polymer, comprising; obtaining the dispersed composition containing the particles of the fluorine-containing polymer in the same manner as in the above process (1) except that the above-mentioned organosilicon compound is not added, heating the obtained dispersed composition up to a given temperature, adding the emulsified solution of the monomer having a reactive $\alpha,\beta$-unsaturated group gradually, adding the polymerization initiator to initiate the seed polymerization, and after the lapse of a given time, rendering the reaction system to normal temperature and normal pressure, and then after neutralization, adding the above-mentioned organosilicon compound.

(3) In the above process (2), there is used, as the above-mentioned fluorine-containing polymer, a copolymer obtained by copolymerizing the monomer mixture containing 70 to 95% by mole of VdF and 5 to 30% by mole of CTFE, and as the above-mentioned monomer having a reactive $\alpha,\beta$-unsaturated group, there is used the acrylate and/or methacrylate.

(4) A process wherein the compound represented by the above-mentioned formula (I), (III) or (V) is used as the organosilicon compound.

The present invention is then explained by means of Examples, but is not limited thereto.

PREPARATION EXAMPLE 1

A one-liter pressure resistive reactor equipped with a stirrer was charged with 500 ml of deionized water, 0.5 g of an ammonium salt of perfluoro(octanoic acid) and 0.05 g of polyoxyethylene monostearate (POE40), and then introduction of a pressurized nitrogen gas and deaeration were repeated to remove the dissolved air. The inside pressure of the reactor was raised to 10 kgf/cm$^2$ at 60° C. by using a monomer mixture of VdF/TFE/CTFE having a mixing ratio of 74/14/12% by mole. Then 0.2 g of ammonium persulfate was added, the VdF/TFE/CTFE monomer mixture of 74/14/12% by mole was continuously supplied to maintain the inside pressure of the reactor constant at 10 kgf/cm$^2$, and the reaction was carried out for 30 hours. Afterwards the reaction system was rendered to normal temperature and normal pressure to give a fluorine-containing-polymer-dispersed aqueous composition of PREPARATION EXAMPLE 1.

PREPARATION EXAMPLES 2 and 3

Fluorine-containing-polymer-dispersed aqueous compositions of PREPARATION EXAMPLES 2 and 3 were prepared in the same manner as in PREPARATION EXAMPLE 1 except that supplied monomers were changed as shown in TABLE 1.

PREPARATION EXAMPLE 4

A 200 ml stainless steel autoclave equipped with a stirrer was charged with 14.2 g of cyclohexyl vinyl ether (CHVE) having composition as shown in TABLE 1, 4.2 g of polyoxyethylene allyl ether (POEAE) (available from NOF Corporation, tradename PKA 5003 ), 8.1 g of ethyl vinyl ether (EVE), 66.1 g of ion-exchanged water, 0.35 g of ammonium perfluorooctanoate (emulsifying agent), 0.35 g of potassium carbonate (K$_2$CO$_3$), 0.02 g of sodium hydrogensulfite (NaHSO$_3$) and 0.08 g of ammonium persulfate (initiator), and the reaction system was cooled with ice, and then a pressurized nitrogen gas was introduced to adjust the pressure of the reaction system to be 3.5 kg/cm$^2$ and deaeration was conducted. These pressurization and deaeration were repeated twice. The further deaeration up to 10 mm Hg followed to remove the dissolved air, and 27.5 g of chlorotrifluoroethylene (CTFE) was added. Then reaction was carried out at 30° C. for 12 hours to give a fluorine-containing-polymer-dispersed aqueous composition of PREPARATION EXAMPLE 4.

PREPARATION EXAMPLE 5

A fluorine-containing-polymer-dispersed aqueous composition of PREPARATION EXAMPLE 5 was prepared in the same manner as in PREPARATION EXAMPLE 4 except that the monomers of PREPARATION EXAMPLE 4 were changed to the monomers shown in TABLE 1. In TABLE 1, VSi represents vinyltrimethoxysilane.

PREPARATION EXAMPLE 6

A 200 ml four-necked flask equipped with a stirrer, cooling tube and thermometer was charged with 100 g of the fluorine-containing-polymer-dispersed aqueous composition prepared in PREPARATION EXAMPLE 1, and thereto was added an alkali salt of alkylallylsulfosuccinate (available from Sanyo Kasei Kogyo Kabushiki Kaisha, tradename ELEMINOL JS2) in an amount of 1.0% on the basis of the solid, followed by heating in a water bath with stirring. When the bath temperature reached 80° C., to the reactor was added dropwise for an hour an emulsion prepared by emulsifying, with a 0.5% aqueous solution of an alkali salt of allkylallylsulfosuccinate, a monomer mixture of 13.0 g of methyl methacrylate (MMA), 3.5 g of butyl acrylate (BA) and 2.2 g of polyoxyethylene methacrylate (POEMA) (available from Shin-Nakamura Kagaku Kogyo Kabushiki Kaisha, tradename M90G). Immediately after completion of the addition, 1 ml of a 2% aqueous solution of ammonium persulfate was added to initiate the reaction. Three hours after the initiation of the reaction, the inside temperature of the bath was raised to 85° C., and after keeping at that temperature for one hour, then cooled. Then pH was adjusted to 7 with aqueous ammonia, followed by filtration with 300 mesh metal net to give a fluorine-containing-seed-polymer-dispersed aqueous composition with bluish white color.

PREPARATION EXAMPLES 7 to 9

Fluorine-containing-seed-polymer-dispersed aqueous compositions of PREPARATION EXAMPLES 7 to 9 were prepared in the same manner as in PREPARATION EXAMPLE 6 except that the fluorine-containing-polymer-dispersed aqueous composition and the acrylic monomers were changed as shown in TABLE 2.

PREPARATION EXAMPLE 10

An acrylic resin-dispersed aqueous composition of PREPARATION EXAMPLE 10 was prepared in the same manner as in PREPARATION EXAMPLE 6 except that no fluorine-containing-polymer-dispersed aqueous compositions were used.

With respect to the aqueous compositions of PREPARATION EXAMPLE 1 to 10, the following measurements were made.

Characteristics of Aqueous Compositions

Solid Content

The aqueous composition was dried at 150° C. for one hour in a vacuum dryer. The ratio of a weight after drying to a weight of the aqueous composition before drying is shown by percentage.

Minimum Film Forming Temperature (MFT):

Minimum temperature at which a continuous film was formed was measured with a thermal gradient tester (available from Riken Seiki Saisakusho).

Average Particle Size

Measured by a laser beam scattering particle size measuring device (DLS-3000 available from Otsuka Denshi Kabushiki Kaisha).

The results are shown in TABLES 1 and 2.

TABLE 1

| | PREPARATION EXAMPLES | | | | |
|---|---|---|---|---|---|
| | 1 | 2 | 3 | 4 | 5 |
| Conditions for synthesizing fluorine-containing polymer (% by mole) | | | | | |
| VdF | 74 | 80 | 78 | — | — |
| TFE | 14 | 16 | 16 | — | — |
| CTFE | 12 | 4 | — | 50 | 50 |
| HFP | — | — | 6 | — | — |
| CHVE | — | — | — | 24 | 22 |
| EVE | — | — | — | 24 | 24 |
| POEAE | — | — | — | 2 | 2 |
| VSi | — | — | — | — | 2 |
| Characteristics of fluorine-containing-polymer-dispersed aqueous composition | | | | | |
| Solid content (%) | 38 | 35 | 34 | 45 | 44 |
| Minimum film forming temperature (°C.) | — | — | — | 30 | 34 |
| Average particle size (nm) | 134 | 133 | 136 | 161 | 153 |

TABLE 2

| | PREPARATION EXAMPLES | | | | |
|---|---|---|---|---|---|
| | 6 | 7 | 8 | 9 | 10 |
| Conditions for synthesizing fluorine-containing seed polymer | | | | | |
| Fluorine-containing-polymer-dispersed aqueous composition | | | | | |
| PREPARATION EX. NO. | 1 | 1 | 2 | 3 | — |
| Amount (g) | 100 | 100 | 100 | 100 | — |
| Acrylic monomer | | | | | |
| MMA (g) | 13.0 | 12.2 | 13.0 | 13.0 | 13.0 |
| BA (g) | 3.5 | 3.5 | 3.5 | 3.5 | 3.5 |
| POEMA (g) | 2.2 | 2.2 | 2.2 | 2.2 | 2.2 |
| SiMA (g) | — | 0.8 | — | — | — |
| Characteristics of fluorine-containing-polymer-dispersed aqueous composition | | | | | |
| Solid content (%) | 45 | 45 | 43 | 43 | 45 |
| Minimum film forming temperature (°C.) | 32 | 35 | 41 | 30 | 27 |
| Average particle size (nm) | 156 | 153 | 154 | 152 | 167 |

EXAMPLES 1 to 9 and COMPARATIVE EXAMPLES 1 to 6

As shown in TABLES 3 and 4, the organosilicon compounds A to E mentioned below were mixed to the aqueous compositions prepared in PREPARATION EXAMPLES 4 to 10 in the mounts shown in TABLES 3 and 4 to give the aqueous dispersions of the fluorine-containing polymer of the present invention and the aqueous dispersions of a polymer of COMPARATIVE EXAMPLES. Further, clear films were prepared by using the obtained aqueous dispersions and characteristics thereof were measured.

Characteristics of Clear Film

Elongation and elastic modulus were measured in accordance with JIS K 6301. The results are shown in TABLES 3 and 4.

The symbols (A to E) showing kinds of the organosilicon compounds in TABLES 3 and 4 are as follows:

A: Silane condensation product (oligomer) having a hydrolyzable silyl group

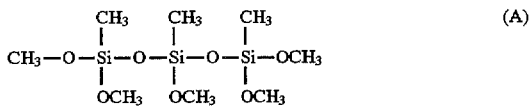

B: Silane compound (monomer) having a hydrolyzable silyl group

C: Silane condensation product (oligomer) having a hydrolyzable silyl group

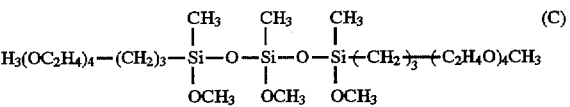

D, E: Silicone oil (condensation product) having no reactive group

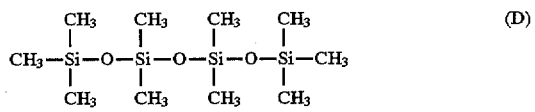

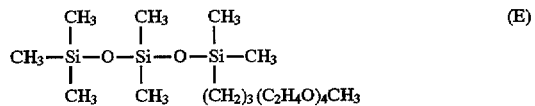

Characteristics of Clear Coatings

A clear coating was prepared by adding the abovementioned organosilicon compound in an amount shown in TABLES 3 and 4 on the basis of 100 parts of solids of the aqueous composition obtained in PREPARATION EXAMPLES 4 to 10, and also adding 10 parts of an auxiliary for film forming, i.e. TEXANOL (available from Eastman Chemical Co., Ltd.), followed by mixing sufficiently.

The obtained paint was applied on a slate by use of an airless spray gun so that a dry thickness of the coating film was 30 μm. The coated slate was dried at room temperature for one week, and adhesion of the coating was evaluated as mentioned below. Also the slate coated with the clear coating was subjected to an adhesion test in the same manner as above after being allowed to stand in an accelerated weathering machine (SUV) for 1,000 hours. The results are shown in TABLES 3 and 4.

Characteristics of White Coating Film

The organosilicon compound was added as shown in TABLES 3 and 4 on the basis of 100 parts of solids in the aqueous compositions obtained in PREPARATION EXAMPLES 4 to 10, and in addition, there were added 50 parts of titanium oxide (tradename CR 90 available from Ishihara Sangyo Kabushiki Kaisha) as an inorganic pigment, 2 parts of DISCOAT H-14 (available from Nippon Nyukazai Kabushiki Kaisha) as a dispersing agent, 1 part of ethylene glycol as an antifreezing agent, 0.5 part of FS ANTIFOAM 013B (available from Nippon Nyukazai Kabushiki Kaisha) as an antifoaming agent, 0.5 part of SN THICKENER A-818 (available from Sunnopco Co., Ltd.) as a thickener and 10 parts of TEXANOL (available from Eastman Chemical Co., Ltd.) as an auxiliary for film forming, followed by mixing with a Disper stirrer to prepare a paint.

Gloss

The obtained paint was applied on an aluminum plate by means of an applicator so that the coating thickness after drying was 20 μm. After drying at room temperature for one week, gloss of the coating was measured with a gloss meter (available from Suga Shikenki Kabushiki Kaisha).

Adhesion

The obtained paint was applied on a slate by means of an airless spray gun so that the coating thickness after drying was 40 μm. Also the paint was applied with the airless spray gun similarly on a slate which had been coated with an acrylic resin type aqueous emulsion sealer, i.e. MOBINYL 940 (Hoechst Gosei Kabushiki Kaisha), so that the coating thickness after drying was 40 μm. The coated slates were dried at room temperature for one week and an adhesion test was carried out according to JIS K 5400. Then an adhesion test using an adhesive tape was carried out for 100 cut squares of the coating film, and the number of remaining squares was measured.

Weatherability Test

After those coated slates were allowed to stand in the accelerated weathering machine (Eyesuper UV tester (SUV-W13)) for 1,000 hours, gloss and adhesion were measured as follows.

Gloss

After the tests of the coating film on the aluminum base plate, gloss was measured in the same manner as above.

Adhesion

The adhesion was measured in the same manner as above for the coating films prepared by application direct on the slate and on the slate coated with the acrylic sealer.

The results are shown in TABLES 3 and 4.

TABLE 3

| | EXAMPLE NO | | | | | | | | |
|---|---|---|---|---|---|---|---|---|---|
| | 1 | 2 | 3 | 4 | 5 | 6 | 7 | 8 | 9 |
| Fluorine-containing polymer | | | | | | | | | |
| PREPARATION EXAMPLE NO. | 6 | 7 | 8 | 9 | 4 | 5 | *6 | 6 | 7 |
| Amount (part by weight) (Solids) | 100 | 100 | 100 | 100 | 100 | 100 | 100 | 100 | 100 |
| Organosilicon compound | | | | | | | | | |
| Kind | A | A | A | A | A | A | A | B | C |
| Amount (%) (Solids) | 2 | 2 | 2 | 2 | 2 | 2 | 15 | 2 | 2 |
| Minimum film forming temperature (°C.) | 32 | 34 | 43 | 45 | 36 | 34 | 39 | 34 | 33 |
| Characteristics of clear film | | | | | | | | | |
| Elongation (%) | 256 | 200 | 140 | 123 | 85 | 78 | 210 | 243 | 270 |
| Elastic modulus (kgf/cm$^2$) | 1.1 | 1.5 | 1.0 | 1.0 | 0.7 | 0.9 | 1.2 | 1.1 | 1.0 |
| Characteristics of clear coating | | | | | | | | | |
| Adhesion to slate | | | | | | | | | |
| Initial | 100/100 | 100/100 | 100/100 | 100/100 | 100/100 | 100/100 | 100/100 | 100/100 | 100/100 |
| After weatherability test | 97/100 | 100/100 | 100/100 | 100/100 | 100/100 | 100/100 | 100/100 | 90/100 | 100/100 |
| Characteristics of white coating film | | | | | | | | | |
| Initial | | | | | | | | | |
| Gloss | 74 | 72 | 65 | 58 | 51 | 62 | 57 | 65 | 67 |
| Adhesion | 100/100 | 100/100 | 100/100 | 100/100 | 100/100 | 100/100 | 100/100 | 100/100 | 100/100 |
| After weatherability test | | | | | | | | | |
| Gloss | 64 | 65 | 58 | 43 | 45 | 56 | 43 | 50 | 60 |
| Adhesion | 100/100 | 100/100 | 98/100 | 100/100 | 100/100 | 100/100 | 100/100 | 95/100 | 100/100 |

TABLE 4

| | COMPARATIVE EXAMPLE NO. | | | | | |
|---|---|---|---|---|---|---|
| | 1 | 2 | 3 | 4 | 5 | 6 |
| Fluorine-containing polymer | | | | | | |
| PREPARATION EXAMPLE NO. | 6 | 6 | 6 | 10 | 10 | 6 |
| Amount (part by weight) (Solids) | 100 | 100 | 100 | 100 | 100 | 100 |
| Organosilicon compound | | | | | | |
| Kind | A | D | — | A | B | E |
| Amount (%) (Solids) | 40 | 2 | — | 2 | 2 | 2 |
| Minimum film forming temperature (°C.) | 38 | 37 | 32 | 27 | 26 | 33 |
| Characteristics of clear film | | | | | | |
| Elongation (%) | 212 | 183 | 260 | 160 | 170 | 230 |
| Elastic modulus (kgf/cm$^2$) | 0.7 | 0.9 | 1.0 | 0.8 | 0.9 | 0.9 |
| Characteristics of clear coating | | | | | | |
| Adhesion to slate | | | | | | |
| Initial | 100/100 | 60/100 | 60/100 | 100/100 | 100/100 | 70/100 |
| After weatherability test | 90/100 | 50/100 | 0/100 | 20/100 | 20/100 | 40/100 |
| Characteristics of white coating film | | | | | | |
| Initial | | | | | | |
| Gloss | 30 | 36 | 75 | 73 | 76 | 36 |
| Adhesion | 100/100 | 73/100 | 65/100 | 100/100 | 100/100 | 75/100 |
| After weatherability test | | | | | | |
| Gloss | 18 | 28 | 60 | 11 | 9 | 31 |
| Adhesion | 95/100 | 70/100 | 35/100 | 10/100 | 20/100 | 50/100 |

INDUSTRIAL APPLICABILITY

As it is clear from the above-mentioned results, the paint, which is obtained from the aqueous dispersion of the fluorine-containing polymer of the present invention in which a specific fluorine-containing polymer and an organosilicon compound are mixed, is excellent in initial and long-term adhesion, and can provide a coating film being excellent in weatherability, lengthy durability, scratch resistance and soil resistance.

Also in the present invention;

(1) The aqueous dispersion of the fluorine-containing polymer of the present invention, which contains particles of the fluorine-containing polymer and has an excellent effect on adhesion to a base material, can be obtained by adding water and the emulsifying agent to a reactor, repeating introduction of a pressurized nitrogen gas and deaeration, introducing the pressurized fluoroolefin monomer, and if necessary, adding the monomer copolymerizable with the fluoroolefin, and adding the polymerization initiator, maintaining the inside pressure of the reactor constant for a given period of time, rendering the reaction system to normal temperature and normal pressure, and then adding the organosilicon compound. (2) Also the aqueous dispersion of the fluorine-containing polymer of the present invention, which contains particles of the fluorine-containing seed polymer and has good effects on adhesion to a base material and film forming property, can be obtained by preparing the dispersed composition containing particles of the fluorine-containing polymer in the same manner as in the above (1) except that no organosilicon compound is added, heating the obtained dispersed composition to a given temperature, introducing the emulsified solution of the monomer having a reactive α,β-unsaturated group gradually, adding the polymerization initiator to initiate the seed polymerization, and after the lapse of a given period of time, rendering the reaction system to normal temperature and normal pressure and then after neutralization, adding the organosilicon compound.

(3) In the above (2), there is used, as the above-mentioned fluorine-containing polymer, a copolymer obtained by copolymerizing the monomer mixture containing 70 to 95% by mole of VdF and 5 to 30% by mole of CTFE, and as the above-mentioned monomer having a reactive α,β-unsaturated group, there is used the acrylate and/or methacrylate. Thus excellent effects on film forming property and transparency of the formed film can be obtained.

(4) Further in the present invention, by using the organosilicon compound represented by the above-mentioned formula (I), (III), (V) and (VI), good effects on adhesion to a base material, weatherability and soil resistance can be obtained.

(5) Also by using the following compounds as the examples of (III) and (V), respectively,

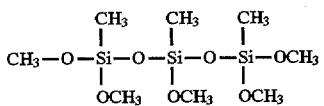

and

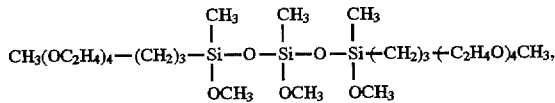

further good effects on dispersing stability, adhesion and film forming property can be obtained.

We claim:

1. An aqueous dispersion of a fluorine-containing polymer, wherein 1 to 20 parts by weight of an organosilicon compound is admixed on the basis of 100 parts by weight of solids in a fluorine-containing-polymer-dispersed aqueous composition; said fluorine-containing polymer in said fluorine-containing-polymer-dispersed aqueous composition is a fluorine-containing seed polymer obtained by seed-polymerizing a monomer having a reactive a, unsaturated group in the presence of particles of fluorine-containing polymer obtained by polymerizing a fluoroolefin or by copolymerizing a fluoroolefin with a monomer copolymerizable therewith, said organosilicon compound is admixed after said seed-polymerization; and 0.1 to 50% by weight of said monomer having said reactive α,β-unsaturated group is an organosilicon compound having a reactive α,β-unsaturated group.

2. An aqueous dispersion of a fluorine-containing polymer, wherein 1 to 20 parts by weight of an organosilicon compound is admixed on the basis of 100 parts by weight of solids in a fluorine-containing-polymer-dispersed aqueous composition; said fluorine-containing polymer in said fluorine-containing-polymer-dispersed aqueous composition is a fluorine-containing seed polymer obtained by seed-polymerizing an acrylic acid ester and/or a methacrylic acid ester in the presence of particles of a fluorine-containing polymer obtained by copolymerizing a monomer mixture containing 70 to 95% by mole of vinylidene fluoride and 5 to 30% by mole of chlorotrifluoroethylene; and said organosilicon compound is admixed therewith after said seed-polymerization.

3. An aqueous dispersion of a fluorine-containing polymer, wherein 1 to 20 parts by weight of an organosilicon compound is admixed on the basis of 100 parts by weight of solids in a fluorine-containing-polymer-dispersed aqueous composition; and said organosilicon compound is an organosilicon oligomer represented by the formula (V):

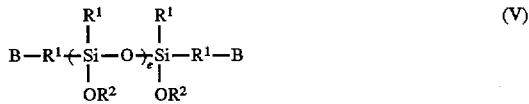

wherein $R^1$ is a non-hydrolyzable group or hydrogen atom, $R^2$ is alkyl, aryl, alkenyl or hydrogen atom, B is a surface active group, and e is an integer of 2 to 50.

4. An aqueous dispersion of a fluorine-containing polymer, wherein 1 to 20 parts by weight of an organosilicon compound is admixed on the basis of 100 parts by weight of solids in a fluorine-containing-polymer-dispersed aqueous composition; said fluorine-containing polymer in said fluorine-containing-polymer-dispersed aqueous composition is a fluorine-containing seed polymer obtained by seed-polymerizing a mixture of monomers having a reactive α,β-unsaturated group in the presence of particles of fluorine-containing polymer obtained by polymerizing fluoroolefin or by copolymerizing a fluoroolefin and a monomer copolymerizable therewith, said organosilicon compound is admixed after said seed-polymerization; said mixture of monomers having said reactive α,β-unsaturated group comprises an acrylic acid ester and/or a methacrylic acid ester and an organosilicon compound having a reactive α,β-unsaturated group; and said monomer having said reactive α,β-unsaturated group is contained in said mixture of monomers in a amount of 0.1 to 50% by weight.

5. An aqueous dispersion of a fluorine-containing polymer, wherein 1 to 20 parts by weight of an organosilicon compound is admixed on the basis of 100 parts by weight of solids in a fluorine-containing-polymer-dispersed aqueous composition; said fluorine-containing polymer in said fluorine-containing-polymer-dispersed aqueous composition is a fluorine-containing seed polymer obtained by seed-polymerizing a monomer having a reactive α,β-unsaturated group in the presence of particles of fluorine-containing polymer obtained by copolymerizing vinylidene fluoride and cholorotrifluorethylene; said particles of said fluorine-containing polymer containing 70 to 95% by mole of vinylidene fluoride and 5 to 30% by mole of chlorotrifluoroethylene; said monomer having said reactive α,β-unsaturated group is an acrylic acid ester and/or a methacrylic acid ester; and said organosilicon compound is admixed therewith after said seed-polymerization.

6. The aqueous dispersion of the fluorine-containing polymer of claim 5, wherein said fluorine-containing polymer contains 70 to 95% by mole of vinylidene fluoride and 5 to 30 % by mole of chlorotrifluoroethylene.

7. The aqueous dispersion of the fluorine-containing polymer of claim 4, wherein said fluorine-containing polymer contains 70 to 95% by mole of vinylidene fluoride and 5 to 30% by mole of chlorotrifluoroethylene.

* * * * *